A. P. PERLIN.
COMB.
APPLICATION FILED SEPT. 2, 1913.

1,108,224.

Patented Aug. 25, 1914.
2 SHEETS—SHEET 1.

Witnesses:
H. J. Bull
T. Colson

Inventor
Abraham P. Perlin
By Joshua R. H. Potts
His Attorney

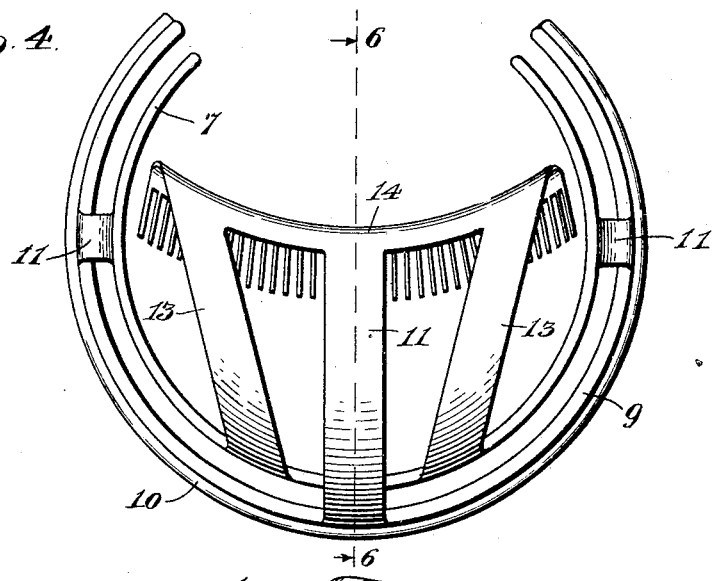
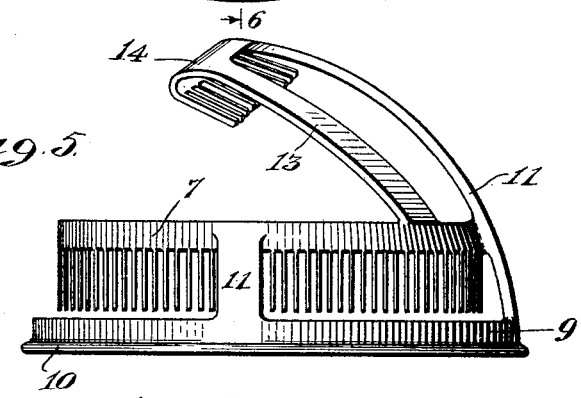
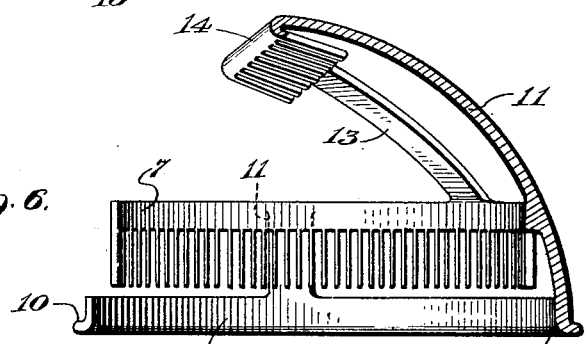

UNITED STATES PATENT OFFICE.

ABRAHAM P. PERLIN, OF CHICAGO, ILLINOIS.

COMB.

1,108,224.  Specification of Letters Patent.  Patented Aug. 25, 1914.

Application filed September 2, 1913. Serial No. 787,719.

*To all whom it may concern:*

Be it known that I, ABRAHAM P. PERLIN, a former subject of the Czar of Russia, who have declared my intention of becoming a citizen of the United States, and a resident of the city of Chicago, county of Cook, and State of Illinois, have invented certain new and useful Improvements in Combs, of which the following is a specification.

My invention relates to combs and more particularly to combs used in cutting hair.

The object of this improvement is to provide a simple and effective comb for the use of barbers and the like in cutting hair especially the hair of children, in a style known as "Buster Brown".

Other objects will appear hereinafter.

The invention consists in the combinations and arrangements of parts hereinafter described and claimed.

Figure 1:
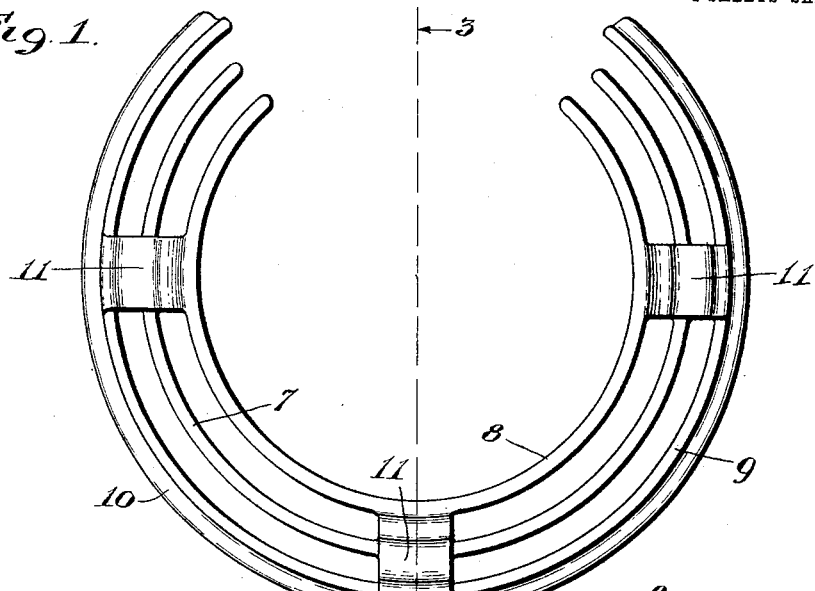
Figure 2:
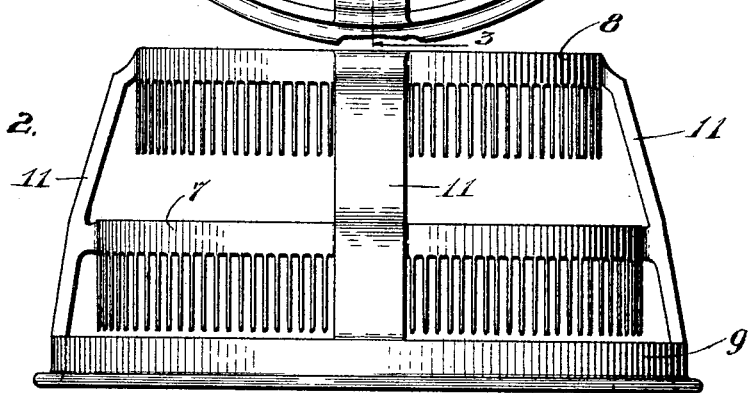
Figure 3:
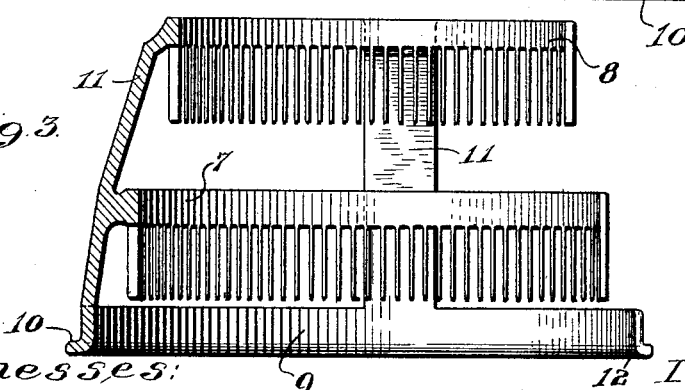

The invention will be best understood by reference to the accompanying drawings forming a part of this specification, and in which, Figure 1 is a plan view of a comb embodying my invention, Fig. 2, a front elevation of the same, Fig. 3 is a section taken on line 3—3 of Fig. 1, Fig. 4 is a plan view of a slightly modified form of comb embodying my invention, Fig. 5 is a side elevation of the same, and Fig. 6 is a section taken on line 6—6 of Fig. 4.

The preferred form of construction as illustrated in the accompanying drawings comprises a comb 7 preferably arcuate in form and a second comb 8 disposed above and substantially coaxial with the comb 7. Below and outside of the comb 7 is a guard 9. The guard 9 is provided with an outwardly extending flange forming a guide 10 of the same length as the guard 9. The combs 7 and 8 and guard 9 are joined together by means of webs 11. The device is preferably made in one piece of celluloid, india rubber composition, or any other suitable substance. The combs 7, 8 and guard 9 however, may be made separately and joined together by the webs 5 secured to the combs and guard. The guide 10 is preferably rounded out on its under edge 12 and has its outer edge extending beyond the guard 9 a distance to permit the free use of a pair of shears, not shown, in cutting the hair.

Figs. 1 to 3 inclusive show my preferred form and Figs. 4 to 6 show a slightly modified form. In this last mentioned form the upper comb is extended almost centrally and above the comb 7. The webs 13 in the modified form are slightly longer and join the comb 7 closer to the point at which the central web joints such comb. This permits of a slightly more flexible connection between the upper comb 14 and lower comb 7 in this modified form. The lower comb 7 and guard 9 are substantially the same in both forms. In each form, the combs are positioned one above the other and adapted to engage different portions of the hair of a person when in use, the better to firmly hold the guard 9 and prevent it from slipping upwardly or downwardly in the hair or tipping up on one side.

In operation the combs are set in the hair of the child with the guard 9 desposed at substantially the position at which the ends of the hair are to be after being cut. The operator then manipulates the shears in the hair over the edge of guide 10 using the latter as a guide to insure all of the hair being cut on a straight line.

While I have illustrated and described the preferred forms of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the kind described comprising a comb; a guard spaced from said comb; and a laterally projecting flange on said guard, substantially as described.

2. A device of the kind described comprising a comb; a guard positioned lower than and at one side of the teeth of said comb; a flange on the side of said guard away from said comb; and a web joining said comb and said guard, substantially as described.

3. A device of the kind described comprising an arcuate comb; a guard disposed coaxially with said comb; and webs joining said comb and said guard, substantially as described.

4. A device of the kind described comprising a comb; a guard disposed coaxially with said comb; a laterally projecting flange on said guard; and webs joining said comb and said guard, substantially as described.

5. A device of the kind described comprising two spaced combs one disposed above and at one side of the other; a guard below and at one side of said lower comb; and a web joining said combs and said guard, substantially as described.

6. A device of the kind described comprising two arcuate combs and an arcuate guard disposed coaxially with respect to each other; and webs spacing said combs and guard apart, substantially as described.

7. A device of the kind described comprising an arcuate comb; a second arcuate comb of a shorter diameter than and disposed above said first mentioned comb; an arcuate guard having a larger diameter than and disposed below said first mentioned comb; and webs spacing said combs and said guard apart, substantially as described.

In testimony whereof I have signed my name to this specification in the presence of two subscribing witnesses.

ABRAHAM P. PERLIN.

Witnesses:
JOSHUA R. H. POTTS,
HELEN F. LILLIS.

Copies of this patent may be obtained for five cents each, by addressing the "Commissioner of Patents, Washington, D. C."